United States Patent [19]

Sekino et al.

[11] Patent Number: 5,022,673
[45] Date of Patent: Jun. 11, 1991

[54] WHEEL SUSPENSION SYSTEM FOR AUTOMOBILES

[75] Inventors: Yousuke Sekino; Masaaki Minakawa, both of Saitama, Japan

[73] Assignee: Honda Giken Kogyo Kabushiki Kaisha, Tokyo, Japan

[21] Appl. No.: 473,527

[22] Filed: Feb. 1, 1990

[30] Foreign Application Priority Data

Feb. 3, 1989 [JP] Japan .................................... 1-24915
Jun. 5, 1989 [JP] Japan .................................. 1-142579

[51] Int. Cl.5 ............................................. B60G 7/00
[52] U.S. Cl. .................................. 280/673; 280/96.1; 280/666
[58] Field of Search ...................... 280/96.1, 660, 663, 280/666, 670, 673, 675

[56] References Cited

U.S. PATENT DOCUMENTS

4,798,396 1/1989 Minakawa ........................... 280/673
4,943,082 7/1990 Kijima et al. ....................... 280/673

Primary Examiner—Kenneth R. Rice
Attorney, Agent, or Firm—Armstrong, Nikaido, Marmelstein, Kubovcik & Murray

[57] ABSTRACT

A wheel suspension system for automobiles includes a control arm having a pair of front and rear inner ends and an outer end connected to a knuckle rotatably supporting a wheel. The inner ends are pivotally mounted to a vehicle body. At least one of the inner ends of the control arm is formed into bifurcated arms arranged longitudinally of the vehicle body. One of the bifurcated arms is rectilinearly integrally connected with the other inner end through a connection. A bolt for supporting the bifurcated arms at opposite ends is carried at a middle portion thereof on the vehicle body through a rubber bush. This allows the inner ends of the control arms and a section therebetween to be enhanced in rigidity, thereby enabling reductions in wall thickness and weight of the control arms.

7 Claims, 9 Drawing Sheets

WHEEL SUSPENSION SYSTEM FOR AUTOMOBILES

BACKGROUND OF THE INVENTION

1. Field of the Invention

The field of the present invention is wheel suspension systems for automobiles and particularly, wheel suspension systems for automobiles in which a pair of front and rear inner ends of a control arm connected at its outer end to a knuckle rotatably supporting a wheel are pivotally mounted to a vehicle body.

2. Description of the Prior Art

There are conventionally known such wheel suspension systems for automobiles in which two inner ends of a control arm are formed into a leg-like shape, with a portion connecting the two inner ends being curved toward an outer end of the arm, and opposite ends of a bolt fitted into the inner ends through a rubber bush are carried on a vehicle body, for example, as disclosed in Japanese Patent Application Laid-open No. 77504/86.

With the above prior art systems, however, there is a problem that the rigidities of the leg-like inner ends of the control arm and a portion connecting therebetween are relatively low and hence, the entire control arm is formed at an increased wall thickness in order to compensate for such relatively low rigidities, thereby bringing about an increase in weight.

SUMMARY OF THE INVENTION

The present invention has been accomplished with such circumstances in view, and it is an object of the present invention to provide a wheel suspension system of the above-described type for automobiles, wherein the inner ends have a higher rigidity and this enables a reduction in wall thickness of the control arm.

To attain the above object, according to the present invention, there is proposed a wheel suspension system for automobiles comprising a control arm having a pair of front and rear inner ends and an outer end which is connected to a knuckle rotatably supporting a wheel, the inner ends being pivotally mounted to a vehicle body, wherein at least one of the inner ends of the control arm is comprised of bifurcated arms arranged longitudinally of the vehicle body, one of which is rectilinearly integrally connected with the other inner end through a connection, and a bolt for supporting the bifurcated arms at opposite ends is carried at a middle portion thereof on the vehicle body through a rubber bush.

With the above construction, the rigidities of the inner ends of the control arm and a section therebetween can be enhanced by the connection which rectilineraly connects the inner ends to each other and therefore, it is possible to provide reductions in wall thickness and weight of the control arm. This results in a reduced load under a spring and in an improved responsiveness of the suspension system.

The above and other objects, features and advantages of the invention will be apparent from a reading of the following description of the preferred embodiments, taken in conjunction with the accompanying drawings.

BRIEF DESCRIPTION OF THE DRAWINGS

FIGS. 1 to 9 illustrate a first embodiment of the present invention, wherein

FIGS. 10 and 10A illustrate a second embodiment of the present invention, wherein

DESCRIPTION OF THE PREFERRED EMBODIMENTS

A first embodiment of the present invention will now be described with reference to FIGS. 1 to 9.

Figure 1:
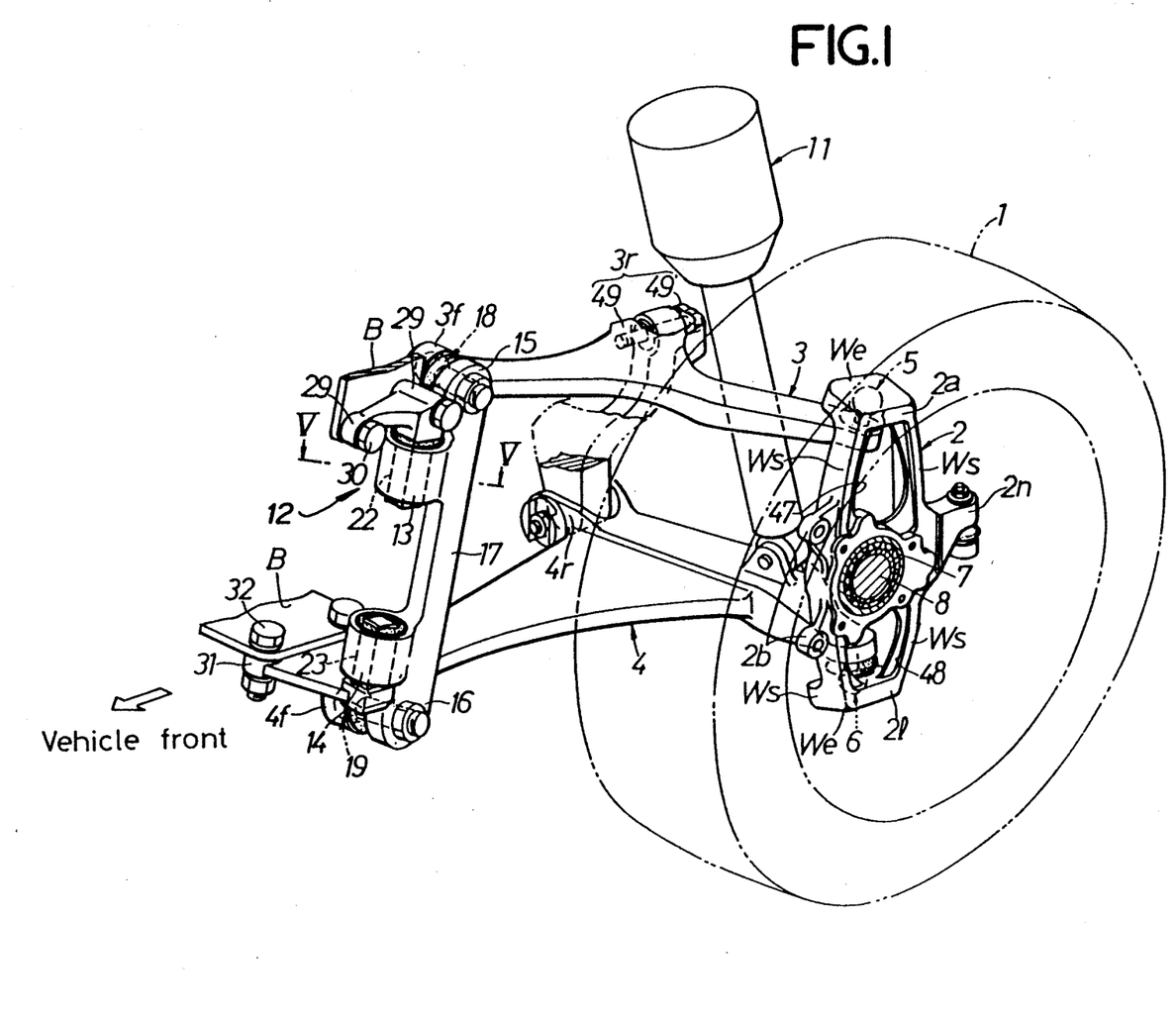
FIG. 1 is a perspective view of a front wheel suspension system for automobiles.

The figures illustrate a front wheel suspension system for an automobile, particularly for a left, front wheel. A suspension system for a right, front wheel is of a construction symmetrical with respect to the left, front wheel suspension system and hence, the illustration thereof is omitted. Referring first to FIG. 1, an upwardly extended upper arm $2a$ and a downwardly extended lower arm $2l$ of a knuckle 2 supporting a wheel 1 are connected respectively through a first ball joint 5 and a second ball joint 6 to outer ends of an upper control arm 3 and a lower control arm 4 which are vertically swingably supported on a vehicle body.

Each of the upper and lower arms $2a$ and $2l$ of the knuckle 2 comprises a pair of front and rear ribbed sidewalls Ws, Ws projected from a bearing boss $2b$ of the knuckle 2, and an end wall We integrally connecting outer ends of the two sidewalls Ws, Ws. An opening 47, 48 of each of the upper and lower arms $2a$ and $2l$ is defined by the two sidewalls Ws, Ws and the end wall We. This provides an enhancement in rigidity and a reduction in weight of the knuckle 2.

An axis connecting centers of respective balls of the first and second ball joints 5 and 6 is a king pin axis K, and a steering mechanism S (FIG. 2) is linked to a knuckle arm $2n$ extended rearwarly from the knuckle 2 in order to turn the wheel 1 about the axis K. A damper 11 with a suspension spring is connected to the lower control arm 4 to bias the latter downwardly.

Figure 2:
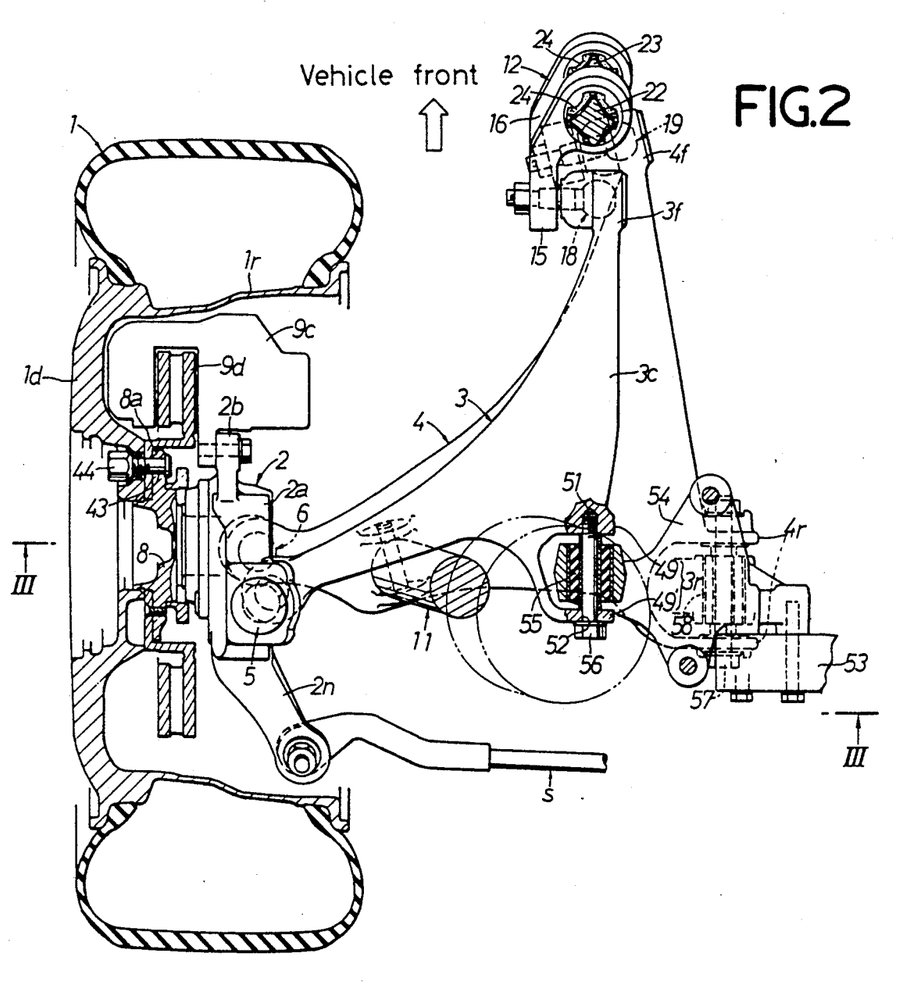
FIG. 2 is a plan view, partially in longitudinal section, of the front wheel suspension system.
Figure 3:
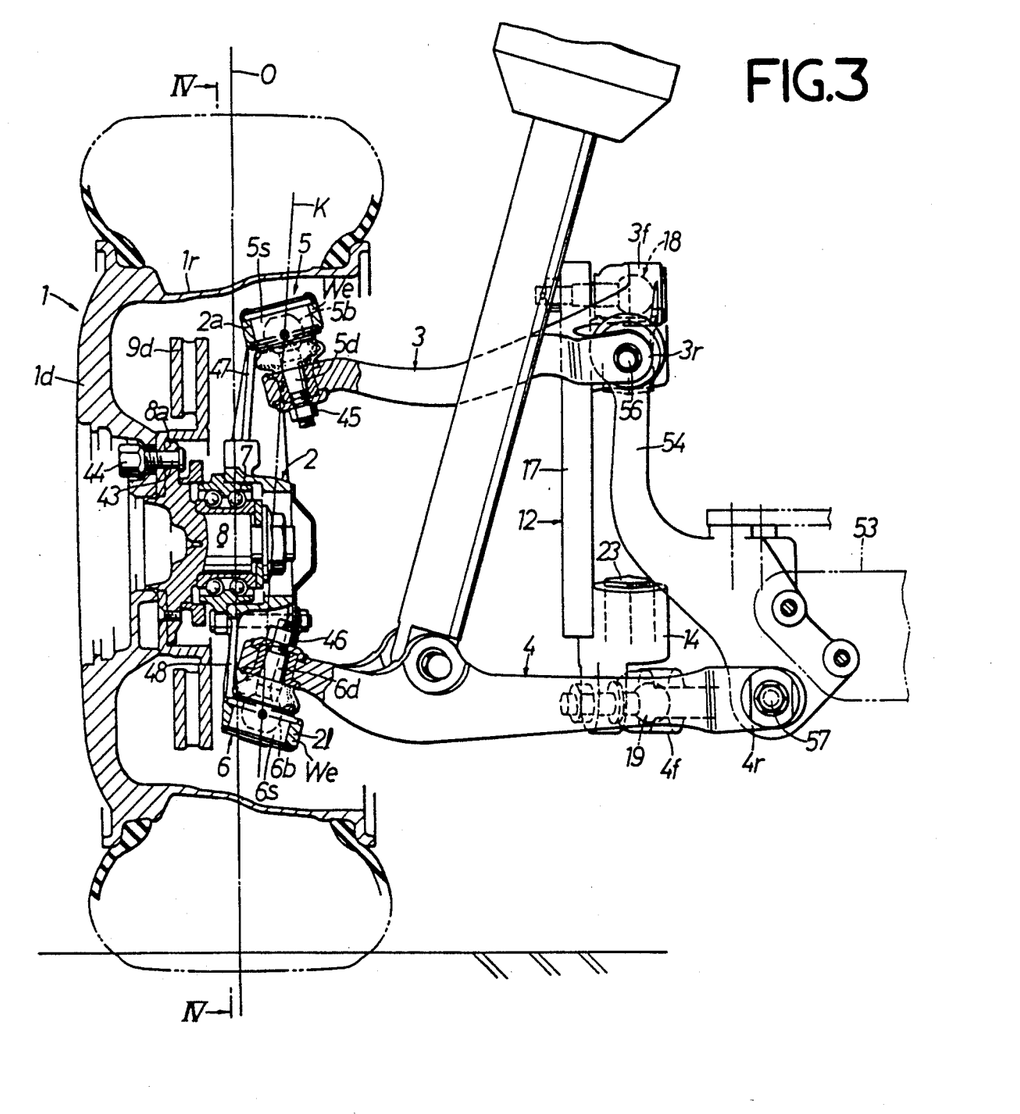
FIG. 3 is a sectional view taken along a line III—III in FIG. 2.
Figure 4:
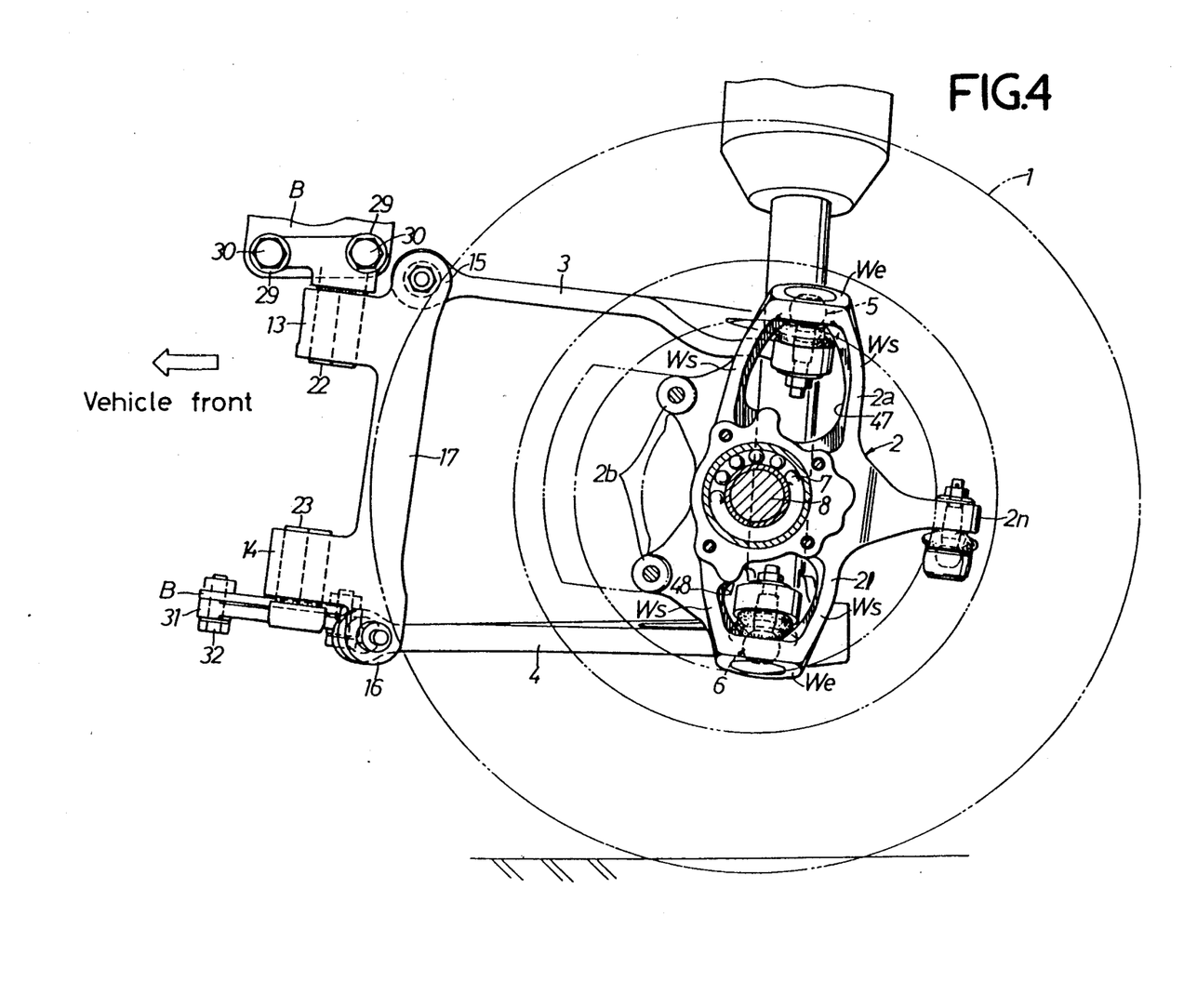
FIG. 4 is a sectional view taken along a line IV—IV in FIG. 3.

Referring to FIGS. 2 to 4, the knuckle 2 rotatably supports an axle 8 at its central portion with a ball bearing 7 interposed therebetween. A wheel disk $1d$ of the wheel 1 is secured to a mounting flange $8a$ formed at an outer end of the axle 8 by a bolt 43 and a wheel nut 44, with a brake disk $9d$ sandwiched therebetween. A rim $1r$ of the wheel 1 is connected to the wheel disk $1d$ to overhang toward the inside of the vehicle body, and the knuckle 2, the first ball joint 5 and the second ball joint 6 are disposed inside an inner peripheral surface of the rim $1r$.

The first ball joint 5 is comprised of a ball stud 5d having a ball 5b formed at one end, and a socket 5s for rotatably holding the ball 5b. The ball stud 5d is taperedly fitted into and secured in the outer end of the upper control arm 3 by a nut 45 with the ball 5b located atop, and the socket 5s is fitted in that end wall We of the upper arm 2a of the knuckle 2 which extends inwardly of the vehicle body.

The second ball joint 6 is also comprised of a ball stud 6d having a ball 6b formed at one end, and a socket 6s for rotatably holding the ball 6b. The ball stud 6d is taperedly fitted into and secured in the outer end of the lower control arm 4 by a nut 46 with the ball 6b located at the bottom, and the socket 6s is fitted in that end wall We of the lower arm 2 of the knuckle 2 which extends inwardly of the vehicle body. In this manner, the outer ends of the upper and lower control arms 3 and 4 are disposed in proximity to the openings 47 and 48 of the upper and lower arms 2a and 2e respectively.

A brake caliper 9c cooperating with the brake disk 9d is supported on a bracket 2b projecting forwardly of the knuckle 2.

The upper control arm 3 has a pair of front and rear inner ends 3f and 3r, the front inner end 3f being connected through a third ball joint 18 to a support shaft 12 which will be described hereinafter.

The rear inner end 3r is comprised of bifurcated arms 49 and 49' arranged longitudinally of the vehicle body, the front arm 49 being rectilineraly integrally connected to the front inner end 3f by a connection 3c extended longitudinally of the vehicle body. The front arm 49 has a female threaded portion 51 formed in a region where it is connected with the connection 3c, and the rear arm 49' has a bolt bore 52 made therein. An outer end of a bracket 54, secured to a sub-frame 53 of the vehicle body, is inserted between the bifurcated arms 49 and 49', and a bolt 56, passing through a first rubber bush 55 which is mounted in the bracket outer end is supported in the bolt bore 52 and the female threaded portion 51. In this way, the rear inner end, 3r is supported on the bracket 54 through the first rubber bush 55. In forming the female threaded portion 51, a threaded bore has been made directly in the front arm 49 in the illustrated embodiment, but a nut may instead be embedded.

On the other hand, the lower control arm 4 has a pair of front and rear inner ends 4f and 4r. The front inner end 4f is connected through a fourth ball joint 19 to the support shaft 12 which will be described hereinafter, and the rear inner end 4r is supported on the bracket 54 through a bolt 57 supported in the rear inner end 4r and through a second rubber bush 58 through which the bolt 57 is passed.

The support shaft 12 is disposed adjacent to the respective front inner ends 3f and 4f of the upper and lower control arms 3 and 4. The support shaft 12 has a pair of cylindrical shaft portions 13 and 14 vertically arranged at a distance. The cylindrical shaft portions 13 and 14 are integrally formed with a pair of upper and lower rearwardly projecting support arms 15 and 16 which are integrally connected to each other through a connecting rod 17. The front inner ends 3f and 4f are connected to the support arms 15 and 16 through the third and fourth ball joints 18 and 19.

An annular element 20, 20 is press-fitted into each of the cylindrical shaft portions 13 and 14, and a plurality of elastic members 24, 24—are interposed between each of the annular elements 20, 20 and each of core shafts 22 and 23 disposed at central portions of the annular elements.

Figure 5:
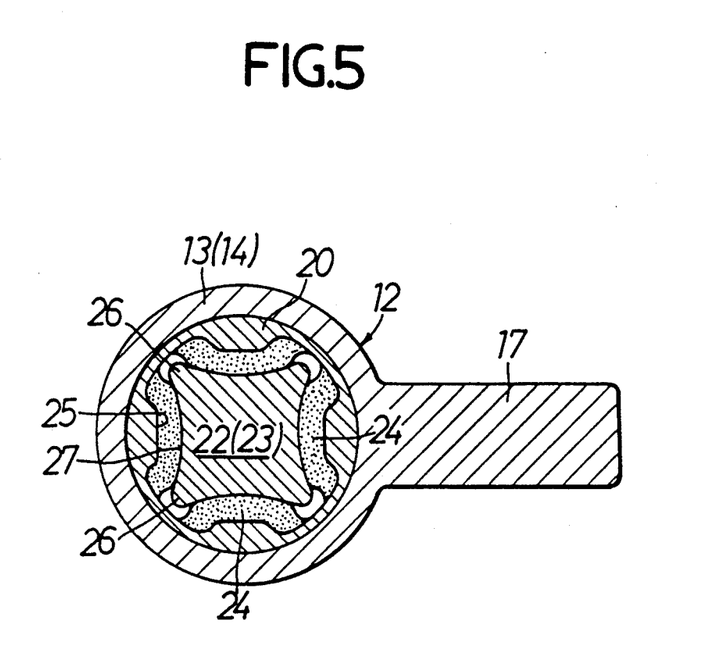
FIG. 5 is a sectional view taken along a line V—V in FIG. 1.

As shown in FIG. 5, a plurality of, e.g., four (in the illustrated embodiment) outer projections 25, 25—are provided on an inner peripheral surface of the annular element 20 at circumferentially equal distances. The same number of inner projections 26, 26—as the outer projections 25, 25—are provided on each of the core shafts 22 and 23 in a circumferentially opposed relation to the outer projections 25, 25—through the elastic members 24. The adjacent ones of the inner projections 26, 26—are connected to each other by a concavely curved surface 27. The elastic member 24 is baked to a surface of the outer projection 25 so that it may be closely adhered to the concavely curved surface 27.

The upper core shaft 22 includes a plurality of mounting bosses 29 integrally provided at its upper end and secured to the vehicle body B by bolts 30. The lower core shaft 23 also includes a plurality of mounting bosses 31 provided at its lower end and secured to the vehicle body B by bolts 32.

The operation of this embodiment will be described below.

Figure 6:
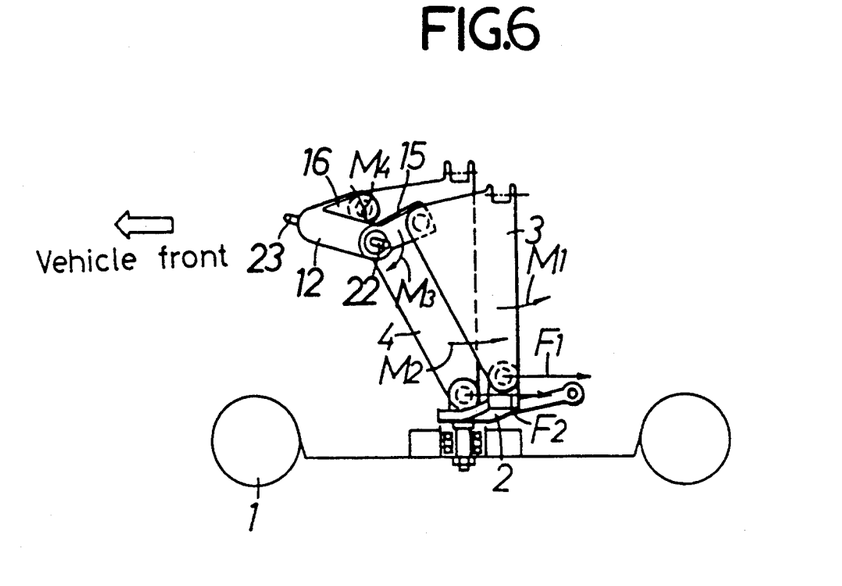
FIGS. 6 and 7 are schematic plan and side views for explaining an operation when a wheel goes up a protrusion on a road surface, respectively.
Figure 7:
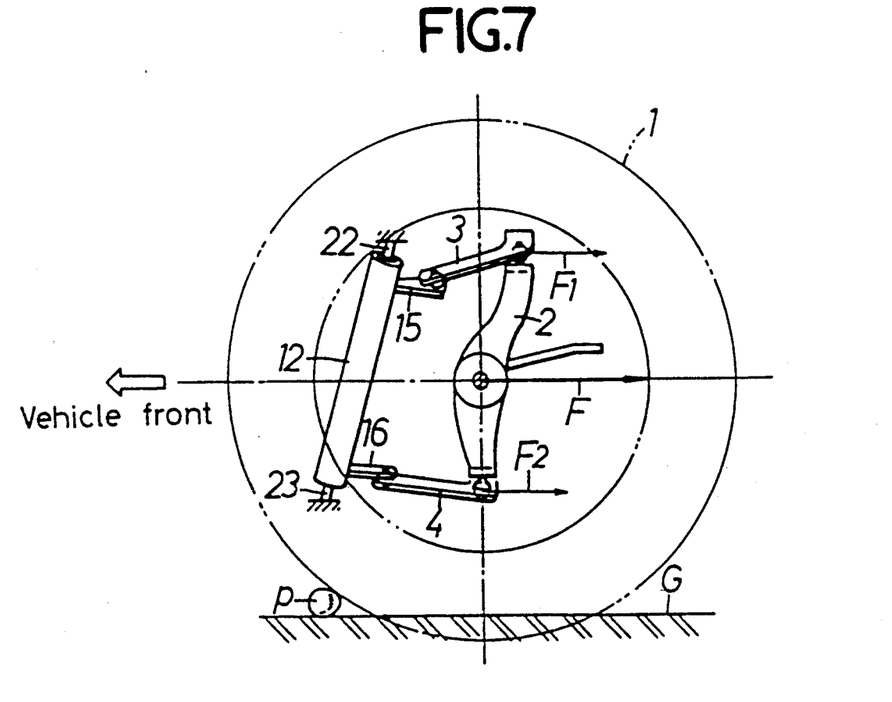

Referring first to FIGS. 6 and 7, suppose that the wheel 1 passes over a protrusion p such as a pebble on a road surface G during travelling of a vehicle. When the wheel 1 goes up the protrusion p, a force F applied from the protrusion p to the knuckle 2 rearwardly of the vehicle body is divided by the knuckle 2 into parallel force components F1 and F2 which act on the outer ends of the upper and lower control arms 3 and 4. Consequently, both the control arms 3 and 4 are subjected to moments M1 and acting rearward of the vehicle and hence, rotational moments M3 and M4 in the same direction are applied to the upper and lower support arms 15 and 16 of the support shaft 12 while deforming the first and second rubber bushes 55 and 58 at the respective rear inner ends 3r and 4r of the control arms 3 and 4. Thus, the total rotational moment M3+M4 received by the support shaft 12 is relatively large, so that the elastic members 24, 24—interposed between the cylindrical shaft portions 13 and 14 and the core shafts 22 and 23 in the support shaft 12 are relatively easily deformed by reception of a shearing force and a compressive force. Therefore, a large longitudinal compliance is given to the wheel suspension system, thereby moderating an impact force from the protrusion p to prevent it from being transmitted to the vehicle body B.

The upward and downward movements of the wheel 1 caused by its passage over the protrusion p are accepted by the vertically swinging movements of the upper and lower control arms 3 and 4 about the bolts 56 and 57 and the third and fourth ball joints 18 and 19, respectively.

Figure 8:
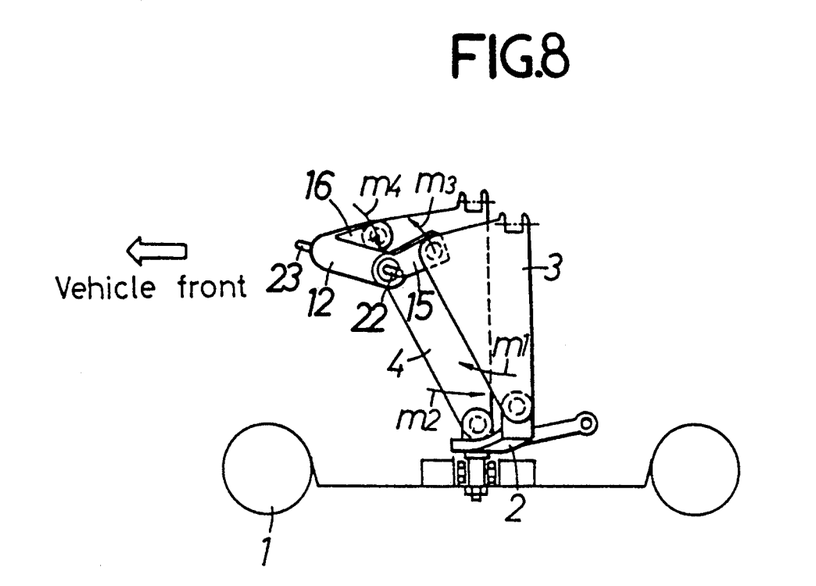
FIGS. 8 and 9 are schematic plan and side views for explaining an operation during braking, respectively.
Figure 9:
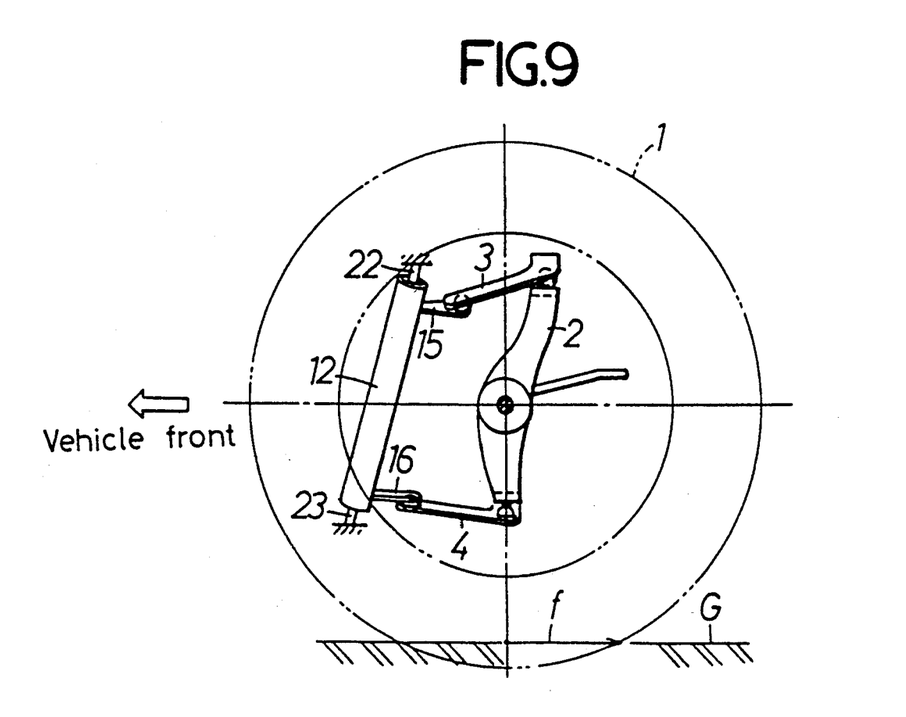

Referring to FIGS. 8 and 9, suppose that a braking force is applied to the wheel 1 by operation of a brake device including elements 9c and 9d during travelling of the vehicle. When a braking force has been applied to the wheel 1, a frictional braking force f applied from the road surface G to the wheel 1 causes a forward moment $m_1$ to be applied to the upper control arm 3 and a rearward moment $m_2$ to be applied to the lower control arm 4. Thus, the upper control arm 3 applies a counterclockwise rotational moment $m_3$ as viewed in FIG. 8 to the upper support arm 15 of the support shaft 12 and reversely, the lower control arm 4 applies a clockwise rotational moment $m_4$ to the lower support arm 16 of the support shaft 12. The rotational moments $m_3$ and $m_4$ applied to the support arms 15 and 16 in this manner are just opposite in direction and hence, are negated together. As a result, the forward or rearward movements of the upper and lower control arms 3 and 4 are restrained to suppress the displacement of the knuckle 2 against the frictional braking force f from the road surface G.

Especially, since the support arms 15 and 16 of the support shaft 12 are connected to each other by the connecting rod 17 at a location largely spaced apart from. The central axis of the support shaft 12, the opposite rotational moments $m_3$ and $m_4$ applied to the support arms 15 and 16 in the above manner are reliably supported by the connecting rod 17. In this way, the support shaft 12 including the support arms 15 and 16 has a larger torsional rigidity and therefore, it is possible to reliably suppress the displacements of the control arms 3 and 4 by the rotational moments $m_1$ and $m_2$ to prevent any variation in caster angle.

In such a wheel suspension system, the first ball joint 5 is disposed with the ball 5b located atop, while the second ball joint 6 is disposed with the ball 6b located at the bottom and hence, it is possible to take the center-to-center distance between the balls of the ball joints 5 and 6 at the maximum in a limited space in the rim 1r of the wheel 1 and this makes it possible to increase the camber rigidity of the wheel 1.

Moreover, in the first ball joint 5 disposed as described above, the ball stud 5d is secured to the upper control arm 3, and the socket 5s is fitted in the upper arm 2a of the knuckle 2 and therefore, it is possible to take a relatively large spacing between the upper control arm 3 and an inner peripheral edge of the rim 1r. On the other hand, in the second ball joint 6 disposed as described above, the ball stud 6d is secured to the lower control arm 4, and the socket 6s is fitted in the lower arm 2l of the knuckle 2 and therefore, it is possible to take a relatively large spacing between the lower control arm 4 and an inner peripheral edge of the rim 1r. Thus, when the upper and lower control arms 3 and 4 are vertically swung with the upward and downward movements of the wheel 1, it is possible to avoid the interference of the rim 1r with the control arms 3 and 4 even if the upward and downward movement stroke of the wheel is larger.

In addition, since the openings 47 and 48 are provided in the upper and lower arms 2a and 2l in an opposed relation to the outer ends of the upper and lower control arms 3 and 4, respectively, the respective outer ends of the upper and lower control arms 3 and 4 can be received in the openings 47 and 48 to provide a further increase in stroke of the upward and downward movements of the wheel 1, even if the bent ends of the upper and lower arms 2a and 2l are formed extremely short so that the king pin axis K is located as close as possible to a center plane O of rotation of the wheel 1. In other words, it is possible to locate the king pin axis K as close as possible to the center plane O of rotation of the wheel 1 without any reduction in stroke of the upward and downward movements of the wheel 1, thereby providing a decrease in steering resistance received by the wheel 1 from the road surface and thus, it is possible to provide a light steering. In addition, the ability to avoid the interference of the knuckle 2 with the upper and lower control arms 3 and 4 by the openings 47 and 48 enables the axes of the ball studs 5d and 6d of the ball joints 5 and 6 to be located on or sufficiently close to the king pin axis K, which is convenient for providing an improvement in durability of the ball joints 5 and 6.

Additionally, since one 49 of the front and rear bifurcated arms 49 and 49' constituting the rear inner end 3r is rectilinearly integrally connected with the front inner end 3f by the connection 3c in the upper control arm 3, the inner ends 3f and 3r and a section therebetween can be enhanced in rigidity to withstand a larger load, and reductions in wall thickness and weight of the control arms 3 and 4 are possible. This results in a reduced load under a spring, leading to an improvement in responsiveness of the suspension system.

Figure 10:
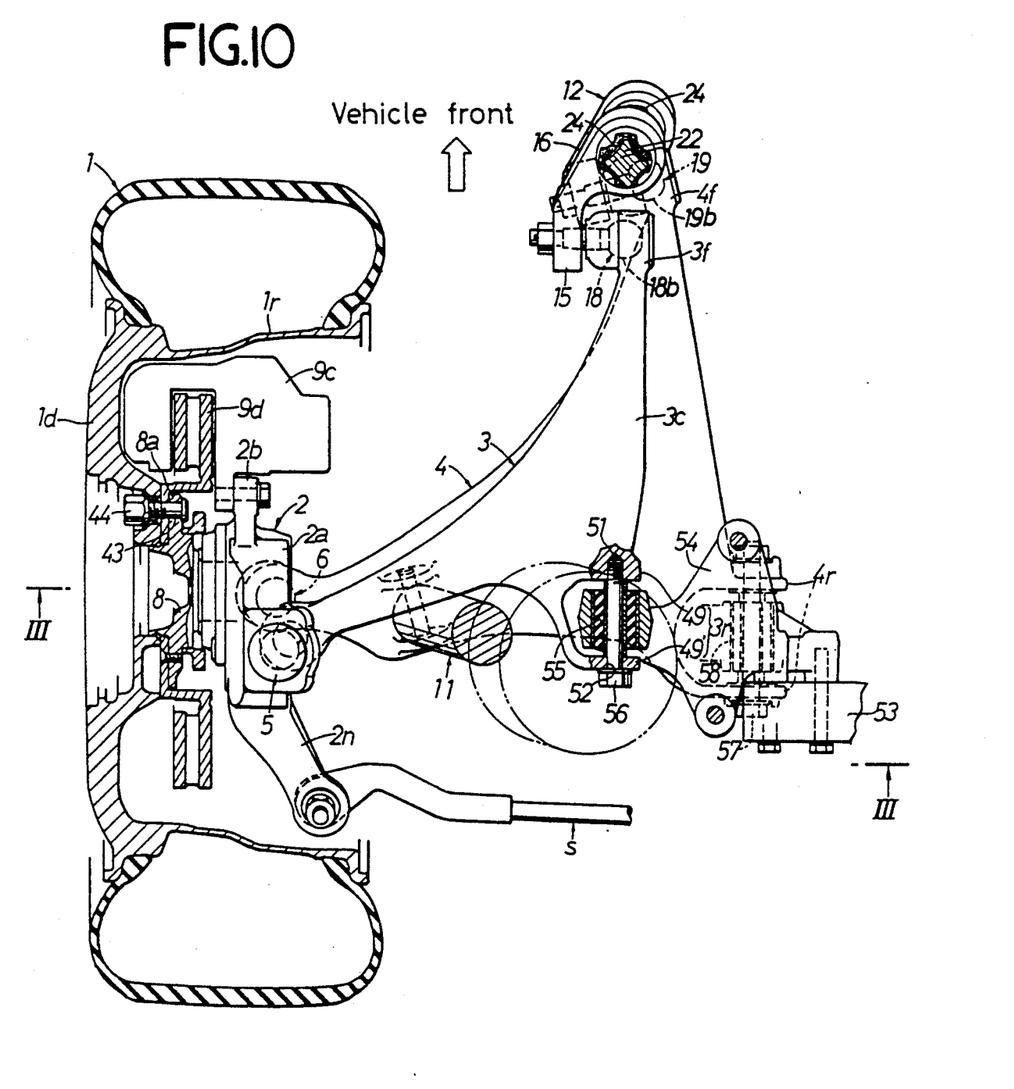
FIG. 10 is a plan view similar to FIG. 2 but illustrating a front wheel suspension system according to the second embodiment partially in longitudinal section.

A second embodiment of the present invention will now be described with reference to FIGS. 10 and 10A. In Figures, portions corresponding to those in the previously described first embodiment are designated by the same reference characters numerals and and differences from the previous first embodiment will be described below.

Figure 10A:
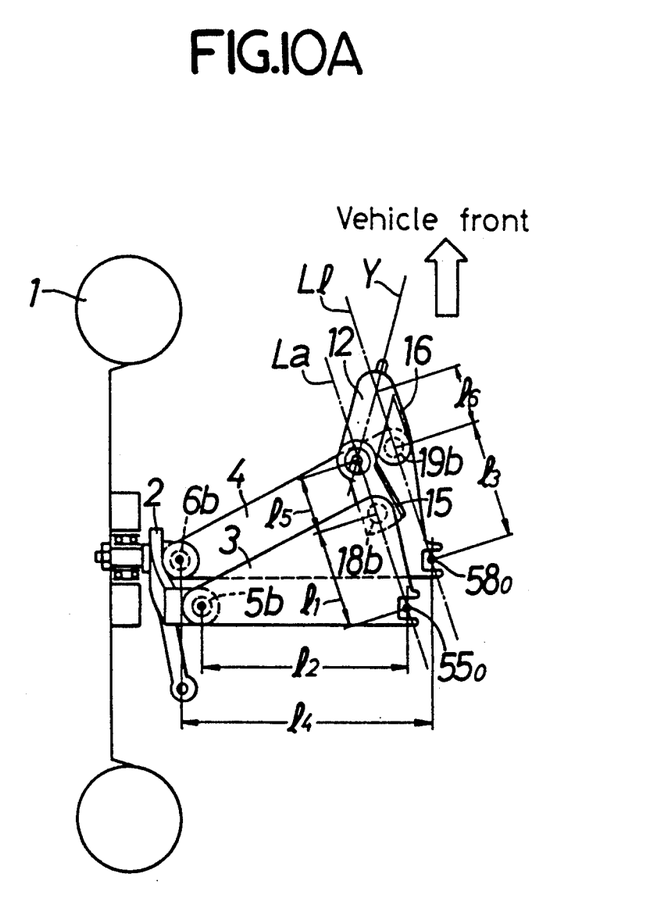
FIG. 10A is a schematic plan view similar to FIG. 10 but illustrating a dimensional relationship of individual portions of each control arm.

Referring to FIG. 10A, the ball 18b of the third ball joint 18 is disposed on a straight line La passing through a center 55o of the first rubber bush 55 and perpendicular to an axis Y of the support shaft 12. The ball 19b of the fourth ball joint 19 is disposed on a straight line Ll passing through a center 58o of the second rubber bush 58 and perpendicular to the axis Y.

The control arms 3 and 4 are formed so that the following expressions are satisfied.

$$\frac{l_6}{l_5} = \frac{l_3 \times l_2}{l_4 \times l_1} \quad (1)$$

wherein $l_1$: Longitudinal width of the inner end of the upper control arm 3 (distance between the first rubber bush 55 and the third ball joint 18);

$l_2$: Length of the upper control arm 3 (distance between the first rubber bush 55 and the first ball joint 5);

$l_3$: Longitudinal width of the inner end of the lower control arm 4 (distance between the second rubber bush 58 and the fourth ball joint 19);

$l_4$: Length of the lower control arm 4 (distance between the second rubber bush 58 and the second ball joint 6);

$l_5$: Length of the upper support arm 15 (distance between the axis Y of the support shaft 12 and the third ball joint 18); and $l_6$: Length of the lower support arm 15 (distance between the axis Y of the support shaft 12 and the fourth ball joint 19).

According to the expression (1), the relations $l_1=l_2$, $l_3=l_4$ and $l_5=l_6$ can be established for ease of designing and fabrication of the individual parts. In this case, each of the control arms 3 and 4 may be formed to include an equilateral triangle with an apex provided by the center 55o, 58o of the corresponding rubber bush 55, 58.

With the second embodiment of the present invention having the above construction, the balls 18b and 19b of the third and fourth ball joints 18 and 19 are respectively disposed on the axes La and Ll passing through the centers 55o and 58o of the first and second rubber bushes 55 and 58 and perpendicular to the axis Y of the support shaft 12, as described above and therefore, when the wheel 1 passes over a protrusion p such as a pebble on a road surface G during forward travelling of a vehicle (see FIGS. 6 and 7), the support arms 15 and 16 of the support shaft 12 turn the balls 18b and 19b rightwardly or leftwardly from their neutral positions in which they are located on the straight lines La and Ll, respectively. The amount of balls 18b and 19b displaced along the straight lines La and Ll at this time are smaller than the amount of displacement of the balls caused when the support arms 15 and 16 are turned through the same angle but from positions different from the above-described positions. Consequently, it is possible to suppress the amounts of deformation first and second rubber bushes to the minimum and reduce stresses generated at the rubber bushes 55 and 58 to the maximum.

Thus, a larger longitudinal compliance can be applied to the wheel suspension system, thereby moderating the impact force from the protrusion p to prevent it from being transmitted to the vehicle body B, while at the same time, reducing the load on the first and second rubber bushes 55 and 58.

Further in this case, no variation in attitude of the king pin axis K occur by virture of the establishment of the above-described expression (1), despite rearwardly swinging movements of the control arms 3 and 4 and therefore, a predetermined caster angle of the wheel 1 can be insured, contributing to an improvement in steering stability.

By properly setting the lengths $l_1$ to $l_6$ in no dependence on the above-described expression (1), it is possible to vary the caster angle in a direction where the trail of the front wheel 1 is reduced, during rearwardly swinging movements of the control arms 3 and 4 by the moments M1 and M2. In this case, the reduction in trail is useful for reducing the transmission of an impact force from the protrusion p to the steering mechanism S to the utmost.

The operation during the forward travelling of the vehicle has been described above, but even when the front wheel 1 passes over the protrusion p during reversing of the vehicle, the movements of the individual parts are merely opposite and a similar operation can be obtained.

In addition, even when the front wheel 1 passes over the protrusion p during braking of the wheel, the above described operation can be obtained and a good longitudinal compliance cannot be lost.

While the present invention has been described as being applied to the front wheel suspension system, it will be understood that the present invention is also, of course, applicable to a rear wheel suspension system.

What is claimed is:

1. A wheel suspension system for automobiles comprising:
a control arm having a pair of front and rear inner ends and an outer end which is connected to a knuckle rotatably supporting a wheel, the inner ends being pivotally mounted to a vehicle body, wherein at least one of the inner ends of the control arm is comprised of bifurcated arms arranged longitudinally of the vehicle body, one of said bifurcated arms being rectilinearly integrally connected with the other inner end through a connection, and a bolt for supporting the bifurcated arms at opposite ends being carried at a middle portion thereof on the vehicle body through a rubber bush.

2. A wheel suspension system for automobiles, comprising:
a pair of upper and lower control arms each having an outer end and a pair of front and rear inner ends, the control arms being connected at the outer ends through first and second ball joints to a knuckle supporting a wheel, one of each pair of the inner ends being pivotally mounted to a vehicle body through first and second rubber bushes for vertically swinging movement, respectively, and the other inner ends of each pair being connected respectively through third and fourth ball joints to a pair of upper and lower support arms provided on a support shaft which extends vertically and is supported on the vehicle body through an elastic member, wherein said one of the inner ends of at least one of said control arms is comprised of bifurcated arms arranged longitudinally of the vehicle body, one of said bifurcated arms being rectilinearly integrally connected with the other inner end of the corresponding control arm through a connection, and a bolt supporting said bifurcated arms at opposite ends thereof being carried at a middle portion thereof on the vehicle body through an associated rubber bush.

3. A wheel suspension system for automobiles according to claim 2, wherein said third and fourth ball joints comprise balls respectively, and each of the balls is disposed on a straight line passing through a connection point between said one inner end of the associated control arm and the vehicle body and intersecting an axis of said support shaft.

4. A wheel suspension system for automobiles according to claim 3, wherein each control arm is formed so as to establish the following expression:

$$\frac{l_6}{l_5} = \frac{l_3 \times l_2}{l_4 \times l_1}$$

wherein
$l_1$: longitudinal width of the inner ends of the upper control arm;
$l_2$: length of the upper control arm;
$l_3$: longitudinal width of the inner end of the lower control arm;
$l_4$: length of the lower control arm;
$l_5$: length of the upper support arm; and
$l_6$: length of the lower support arm.

5. A wheel suspension system for automobiles according to claim 2, 3 or 4, wherein said knuckle includes an upwardly extended upper arm and a downwardly extended lower arm inside an inner peripheral surface of a rim of the wheel, and said upper and lower control arms which are disposed are connected to said upper and lower arms of the knuckle through said first and second ball joints, respectively.

6. A wheel suspension system for automobiles according to claim 5, wherein said first ball joint comprises a ball stud having a ball mounted in said upper arm and is disposed so that the ball stud is secured to said upper control arm with the ball located atop, and said second ball joint comprises another ball stud having another ball mounted in said lower arm, said second ball joint being disposed so that said another ball stud is secured to the lower control arm with the another ball located at the bottom.

7. A wheel suspension system for automobiles according to claim 6, further including openings provided respectively in the upper and lower arms of said knuckle in an opposed relation to the outer ends of the upper and lower control arms.

* * * * *